July 22, 1958 F. McMILLEN 2,843,871
WINDOW WIPER WITH HEATED ARM
Filed Aug. 31, 1955 2 Sheets-Sheet 2
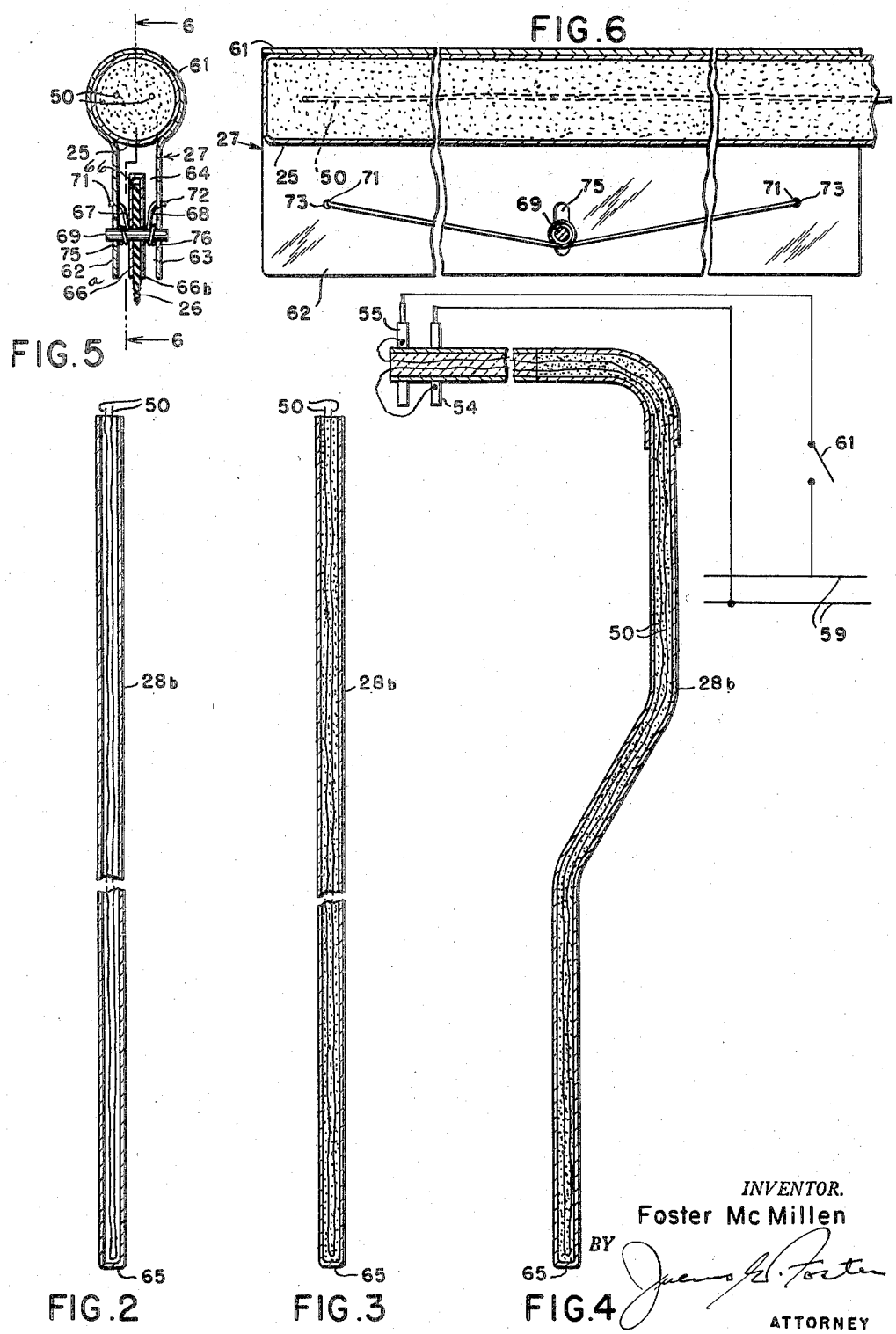
INVENTOR.
Foster McMillen
ATTORNEY United States Patent Office 2,843,871
Patented July 22, 1958

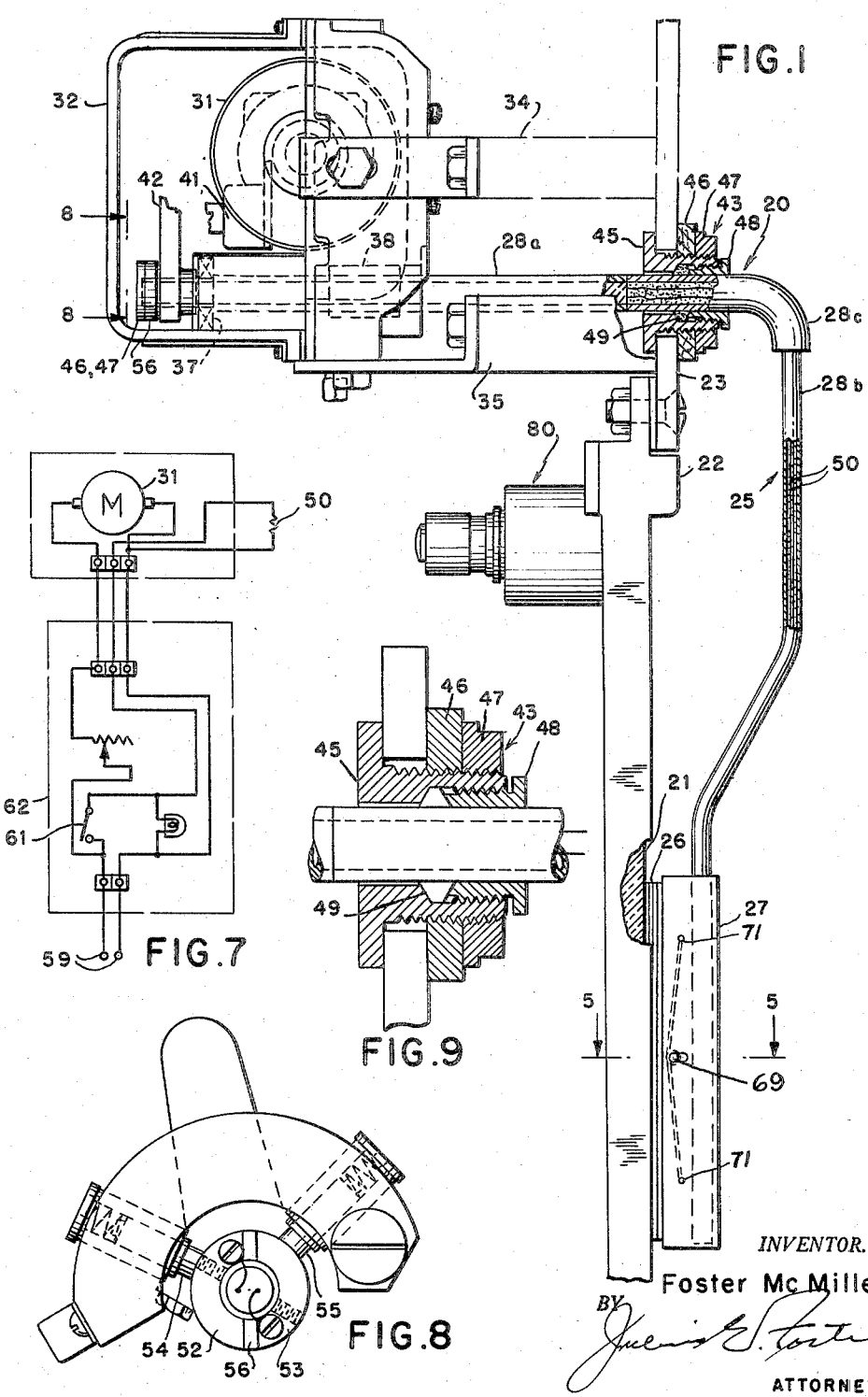

2,843,871

WINDOW WIPER WITH HEATED ARM

Foster McMillen, Staten Island, N. Y., assignor to Kearfott Company, Inc., Little Falls, N. J., a corporation of New York Application August 31, 1955, Serial No. 531,783

5 Claims. (Cl. 15—250.5)

This invention relates to observation windows with window pane wipers, suitable for use in cold environments where freezing temperatures are encountered, and where moisture, snow or ice may form and accumulate on the window and on the wiper.

One particular application for such window and wiper is on sea-going vessels. The observation windows, that are located in the pilot house, or on a navigation bridge, or at other various positions on the ship are subjected to ambient temperature conditions, which at times include temperatures that drop below freezing point, with the consequence that the exposed surfaces of the observation windows may become entirely obscured by the formation and accumulation of moisture, snow or ice.

Much work has already been done towards heating the window pane itself sufficiently to keep the temperature of the exposed window surface above freezing temperature, in order to prevent the formation and accumulation of ice on the exposed window surface.

However, such treatment of the window pane itself, has not been sufficient to prevent the exposed mechanical parts of the window wiper, and particularly the blade, from accumulating moisture or snow, which would accumulate and freeze to ice and stick to the wiper blade. The ice thus formed on the blade destroys the function of the wiper blade and causes the blade to slide over the surface of the window without properly clearing the surface by removing any accumulated moisture and snow, to provide an unobstructed area of vision through the window.

One object of this invention is to provide a wiper which may be electrically heated in a simple manner, in order to keep the temperature of the wiping element above freezing temperature, and thereby to prevent the accumulation or formation of snow or ice on the wiper, that would otherwise interfere with its normal wiping operation on the exposed surface of the associated windowpane.

Another object of the invention is to provide a window wiper, having a wiper blade and an operating arm, with a heating and heat-transfer arrangement, that will heat the operating arm and a space region around the wiper blade, to keep the arm and the wiper blade surfaces at a temperature sufficiently above freezing temperature to prevent snow or ice from sticking to such surfaces.

Another object of the invention is to provide a window wiper having an operating arm, with a heating arrangement for the arm that will prevent the formation of ice on the arm that would prevent functioning of the arm or lift the arm and the blade from the window surface.

In a simplified preferred construction of the invention, the operating arm for the wiper blade is provided or formed as a substantially continuous tubular element that serves as a metallic jacket for an internally disposed heating element. The heating element in the tubular arm is immersed in an insulating material, and is separated from the inner wall of the tube by such material, which is essentially in powdered form. The insulating powder in the hollow tubular arm serves both to insulate the heating element from the metallic tubular body and to transmit the heat from the heating element to the wall of the enclosing tubular body.

The upper end of the tubular arm is suitably mounted in bearings to provide a pivotal support for the arm. Such support will permit simple oscillating movement of the lower or depending end of the arm, where the blade is attached, to establish the desired wiping action at the window surface.

The wiper blade, which is usually made of a rubber strip or of some similar resilient deformable material that will not scratch the surface of the glass window, is constructed in its usual form to have a relatively flat back rib, with the front edge of the rib suitably shaped, as a bead, for example, to provide the desired wiping action on the window surface when the blade is moved back and forth across the surface of the glass window pane.

The back rib of the blade is closely confined between, and supported by, the two side-walls of a tight-fitting metallic shroud, of generally U-shaped cross section, to impart functional rigidity to the blade.

The blade itself is resiliently supported on, and within a space in, a bracket or housing, which conducts heat from the heated arm to heat the space around the blade and thus keep the blade warm enough to prevent ice or snow from sticking thereto. The bracket is substantially of U-shape with a back yoke and two side walls.

The yoke of the bracket is secured in direct surface-to-surface contact with the lower end of the operating arm, for optimum heat transfer from the arm to the bracket. The bracket receives sufficient heat from the operating arm, by conduction, to provide a heated zone between the two side walls. The side walls of the bracket also remain heated to their front edges. The space within the bracket is thus kept heated to a temperature above freezing. The wiper blade rib and the re-enforcing strip are thus kept heated to a temperature which prevents accumulation or sticking of a covering layer of snow or ice.

The construction of the window wiper and the manner in which it is mounted and operated, relative to the window, are shown in some detail in the accompanying drawings, in which:

Figure 1 is a side elevational view of a window and wiper assembly, with portions broken away and portions shown in section, to illustrate the manner in which the wiper arm is supported on the window frame or bulkhead structure and operated to oscillate the wiper blade;

Figures 2, 3 and 4 show the hollow tubular arm in different stages of its formation to include the imbedded heating element, and the insulating and sealing materials;

Figure 5 is a transverse view through the operating arm and the wiper blade, taken along the line 5—5 in Figure 1;

Figure 6 is a longitudinal sectional view taken through the arm and the bracket in a plane parallel to the wiper blade along the line 6—6 in Figure 5;

Figure 7 is a circuit diagram showing the manner in which energy is supplied to the operating motor for the the operating arm, and to the heating element imbedded in the operating arm;

Figure 8 is an end elevational view of the motor-driven end of the operating arm, to show the brushes and arcuate contacts on the arm for delivering electrical heating energy to the heating element; and Figure 9 is an enlarged view of the bulkhead seal.

As shown in Figure 1, a window and wiper assembly 20 comprises, generally, a transparent glass window panel 21 suitably mounted in a frame 22, which is, in turn, anchored on a main wall structure 23, such as a ship's bulkhead, that also provides support for a swivel mounted wiper arm 25. The wiper arm 25 carries a wiper blade 26 resiliently on and in a blade support or bracket shell 27, which the arm oscillates to sweep a predetermined area of the front or exposed surface of the window panel 21 to keep that wiped area free of moisture, or snow, or ice, in order to provide a clear area on the transparent window through which an unobstructed view may be had at all times.

One major field of application for the window and wiper assembly, shown in Figure 1, is on ocean-going vessels, where the window is part of a protective shield or enclosure, or part of an observation post, or navigating bridge, in a location that is exposed to ambient conditions, where freezing temperatures may be encountered, with a consequent formation or accumulation of moisture, snow or ice.

As shown in applicant's co-pending application, Serial No. 531,782, filed August 31, 1955, satisfactory arrangements have been developed to heat the window panel 21 to maintain the outer or exposed surface at a temperature above the freezing point, so that ice would normally not stick to the surface of the window panel itself.

However, such heat at the window panel cannot effectively or conveniently be transferred from window panel to the wiper arm and to the wiper blade to prevent the accumulation of snow on the wiper arm and blade, which subsequently would turn to ice and would interfere with the normal wiping operation.

Heat energy is therefore supplied directly to the wiper arm, and transferred from the wiper arm to the wiper blade, to maintain the temperature on the surfaces of the body of the arm and of the wiper blade above the freezing point.

The wiper normally operates to wipe a selected area of the window panel. In the modification described herein, the wiper arm is supported as a swivelled pendulous element and is oscillated through a predetermined angle about an axis of oscillation. The arm may be supported on a rotatable shaft co-axially disposed with respect to such oscillating axis. In the present modification, the wiper arm is shaped to enable a part of the arm to serve as a swivel shaft for the pendulous portion of the wiper arm. The swivel portion of the arm is supported in a bearing whose front or outer end face must necessarily be exposed to the same ambient conditions and freezing temperatures that would affect the front or exposed part of the wiper. Any moisture collecting on the end face of the bearing, or even collecting on the shaft portion of the wiper arm adjacent the bearing, and then freezing to the bearing, would create a critical condition that could lock the wiper arm against proper operation or even against any operation.

It is of extreme importance, for that reason, to assure that no ice may form on the bearing, or on the arm, that would create a block to prevent normal operation of the wiper arm.

The importance of preventing even a foot-hold for any snow or ice on the bearing, or wiper arm, or window, may be realized when considering the gales that drive rain, snow, or ocean spray against the observation windows and the wipers. Under such conditions, ice has been known to form and accumulate on unprotected unheated surfaces at a rate as fast as thirty inches in an hour.

As shown in Figure 1, the wiper arm 25 is of tubular form and embodies a horizontal power-transmitting swivel portion 28–a, a depending or oscillator portion 28–b to oscillate the wiper blade, and an L or bend portion 28–c connecting the horizontal oscillator portion 28–a and the depending portion 28–b. All three parts of the wiper arm are preferably made of stainless steel to withstand the effects of corrosive marine or industrial atmospheres, and to provide a high degree of strength for the heavy duty service to which the arm will be subjected.

The horizontal swivel portion 28–a is formed of a tubular length whose peripheral surface will be concentric about its axis, at least at the bearing areas, so that said portion may turn or swivel readily to oscillate the depending portion 28–b. The wall thickness of portion 28–a should be sufficient to enable the tubular section to withstand the torsional stresses that will be impressed on it by a driving motor to operate the wiper arm against a heavy load of packed snow on the window.

The L or bend portion 28–c may be formed originally as part of the horizontal portion 28–a, or it may be separately shaped and then brazed or welded to the horizontal portion 28–a.

The depending portion 28–b is secured to the lower end of the L 28–c and is oscillated to swing the wiper blade across the front surface of the window panel 21. Because of the length of the oscillating arm, a thin wall section is used, consistent with the strength required, to reduced the moment of inertia to a minimum, in order to reduce the torsional stresses on the L 28–c and on the horizontal power-transmitting portion 28–a, that would be caused by reversals of the operating force that oscillates the arm.

Power to drive the wiper arm is provided by an electric motor 31, enclosed in a housing 32, which is secured to, and supported on, the ship's structure, or other equivalent window support, by appropriate brackets 34 and 35.

Two co-axially aligned bearings 37 and 38, disposed within the motor housing 32, support the inner, or power-receiving, end of the horizontal swivel portion 28–a of the wiper arm.

The wiper arm is oscillated about the axis of its bearings 37 and 38, which is also the axis of the horizontal portions 28–a. Operating mechanical energy is applied to the inner end of the horizontal portion 28–a from the motor 31 through a speed reduction device 41 and a crank, of which only the crank arm 42 is indicated and shown connected to the inner end of the horizontal wiper arm portion 28.

The outer end of the horizontal arm portion 28–a extends through a bulkhead seal or stuffing gland 43, supported in an opening through the bulkhead, or other equivalent window-supporting structure 23. The stuffing gland 43 serves as a floating self-adjusting outer bearing for the horizontal arm portion 28–a.

The stuffing gland 43 comprises a bushing 45, a felt or rubber seal 46, an outer gland nut 47 and an inner gland nut 48, with a resilient sealing O-ring 49 encircling the horizontal part 28–a. The O-ring is compressed between the inner shoulder of the bushing 45 and the inner gland nut 48.

In order to heat the wiper arm 25, and its associated blade support 27, to the temperature necessary to prevent ice forming on, and sticking to, the wiper arm or the blade, a heating element 50 is disposed over a certain length within the tubular arm 25.

Electrical energy is supplied to the heating element 50 at the inner end of the arm through two slip-ring segments 52 and 53, and associated contact brushes 54 and 55, shown in more detail in Figure 8.

As shown in Fig. 8, the two slip-ring segments 52 and 53 are secured to a base 56 of insulating material that is fixedly mounted on the end of the horizontal arm portion 28–a. The two brushes 54 and 55 are electrically connected to an external supply circuit 59 through a switch 61 enclosed in a control box 62, as shown in Figure 7.

The manner in which the wiper arm is formed, to support an enclosed heating element, is illustrated briefly in Figures 2, 3, 4, and 9. As there shown, the depending portion 28–b of the arm is formed of a hollow cylindrical tube, initially straight, which has its lower end 65 peened inwardly and suitably mechanically sealed to provide a closed end. The heating element 50 is introduced into the arm 25, to be disposed throughout the full length of the depending portion 28–b and the bend 29–c, and a short distance into the horizontal portion 28-a, to provide heat along the full length of depending arm portion 28-b, the bend 29-c and the part of the horizontal portion 28-a within and slightly behind the stuffing gland 43.

After the heating element 50 has been inserted, to the extent indicated, the tube is filled with a powdered insulating material such as magnesium oxide, which is shaken down to pack tightly to support the heating element in spaced and insulated relation from the metallic tubular wall, and to conduct the heat from the heating element to the wall of the tube 25.

Figure 2 shows the heating element 50 inserted in tube 28-b before the insulating powder 51 is added; Figure 3 shows the tube with the powder 51 added. Figure 4 illustrates the insulating powder 51 tightly packed in the tube as an insulating support to hold the heating element 50 away from the wall of the metal tube. As shown in Figure 4, the two outer ends of the heating element 50 are electrically and mechanically connected to the two slip ring sections 54 and 55 which are shown schematically as being offset, instead of as actually in the same plane, as in Figure 8. The heating energy to the heating element is supplied, as previously indicated, from the external energizing circuit 59.

The disposition of the heating element throughout the entire length of the arm exposed beyond the inner surface of the bulkhead seal serves to heat the entire exposed length of the arm to insure the maintenance of the temperature of the outer surface of the arm and the bulkhead seal above freezing point.

In addition to keeping the temperature of the operating arm itself above the freezing point, it is also essential to keep the temperature of the region around the wiper blade above freezing point. The manner in which that is accomplished is indicated in Figures 1, 5, and 6.

As shown in Figure 1, a wiper blade support or bracket 27 is mounted on the lower end of the wiper arm to support the wiper blade 26. As shown in more detail in Figures 5 and 6, the wiper blade support 27 is substantially U-shaped and comprises a semi-cylindrical yoke 61 and two side wall plates 62 and 63.

The semi-cylindrical yoke 61 is closely fitted around the tubular wiper arm 25 and is preferably soldered, brazed or welded to the tubular wiper arm 25 to provide a good heat-conducting bond between the tubular arm 25 and the wiper blade support 27.

The heat normally generated in the arm 25 adjacent such brazed or welded region is conducted to the semi-cylindrical yoke 61 and thence to the two side plates 62 and 63 to establish a heated region or space 64 between said two side plates 62 and 63 to maintain the temperature above freezing point.

The heated space region 64 between the two walls of the bracket 27 is occupied by the wiper blade 26 with its backing member 66, and two biasing springs 67 and 68. The backing member 66 has two side walls 66-a and 66-b that tightly grip and confine the body portion of the rubber wiper blade 26 longitudinally, and provide the necessary rigidity to wipe the wiping edge of the wiper blade across the surface of the window panel.

The wiper blade and its backing member 66 are floatingly supported from and between the two side wall plates 62 and 63 of the wiper blade support 27.

Such support includes the two biasing springs 67 and 68 and a through pin 69. The two biasing springs 67 and 68 are anchored at their respective ends 71 and 72 in longitudinally spaced perforations 73 in the respective side walls 62 and 63 of the wiper blade support 27. The wire of each spring 67 and 68 is looped around the through pin 69 in such a manner and direction as to impress a biasing force on the pin 69 to press the wiper blade and its backing member 66 towards the window panel. When the wiper arm is in its normal position, the wiping edge of the wiper blade is pressed against the window panel, with the two bias springs 67 and 68 under stress and biasing the wiper blade toward the window.

By means of the assembly shown, the heat supplied to the wiping arm may be made sufficient to keep the temperature of the wiping arm and the temperature of the wiper blade support 27 above freezing. The temperature of the re-inforcing rib on the rubber blade is heated by convection to be also kept above freezing.

Thus, ice is prevented from forming on the arm or on the wiper blade support, or on the wiper blade and its biasing springs. Any snow that may tend to accumulate within the blade support 27 will melt out and drip off, in view of the elevated temperature maintained between the two side wall plates 62 and 63. Similarly, the wiper blade and its bias spring assembly will be kept above freezing temperatures, and they will always be free to bias the blade into engagement with the window panel for most efficient wiping operation by the wiper blade.

In order to permit a small amount of lost motion in the movement of the spring assembly and the wiper blade, for any necessary slight adjustment of the wiper blade during wiping action, the two side wall plates 62 and 63 are provided with short narrow slots 75 and 76 to accommodate and guide the through pin 69 integrally secured to the wiper blade and its rib 66. Any suitable means may be employed to prevent undesired axial motion of the through pin 69, that would enable the pin to slip out. For that purpose limit nuts may be provided on both ends of the guide pin 69.

In order to maintain the temperature of the front surface of the front glass panel above freezing temperature, as previously referred to, the panel is heated by an integral electro-conductive transparent glass film on the back surface, as controlled by a thermostat 80, shown here merely for reference.

The present invention has been illustrated by reference to one application, and to one modification that has been described herein. It is obvious, of course, that various modifications may be made in the structural arrangement and disposition of the elements without departing from the spirit and scope of the invention as described.

What is claimed is:

1. In a window cleaner for a transparent observation window pane for use in an environment where one window surface is exposed to ambient conditions including freezing temperatures, with a consequent possible formation and accumulation of moisture, snow or ice; a wiper to wipe and clear a pre-determined area of the exposed surface of the window pane, to permit an unobstructed view through such wiped area, said wiper comprising a wiper blade of a resilient, deformable self-restoring material, having a shaped wiping edge and a supporting and guiding body for the wiping edge, a re-inforcing and supporting metallic strip for the body; an arm for resiliently supporting and actuating the wiper, and including a resilient element to bias the wiper toward the window; and means for heating the arm in the region of the wiper blade to prevent accumulation of snow or ice at the connection between wiper and arm, that would interfere with the proper orientation of the wiper by nullifying the action of the resilient biassing element, said means including a U-shaped bracket of material of high-heat conducting capacity directly mechanically and thermally connected to the actuating arm along the yoke of the U, with the two side walls of the U extending to include both the metallic backing on the wiper and the resilient biasing element for the wiper, to maintain a heated zone around said strip and said biasing element.

2. A heated wiper for clearing a predetermined area of the exposed surface of a window, said wiper comprising: an arm having a swivel portion to oscillate about a horizontal axis, and a depending hollow tubular portion suspended from the swivel portion and movable to sweep in front of a window to be cleared; a heating element in the depending portion; a wiper blade to engage the exposed surface of the window, and consisting of a rubber strip having a longitudinal wiping edge and a backwardly extending re-inforcing body, and a rigid strip tightly engaging the re-inforcing body of the blade to impart functional rigidity to the body for manipulating the wiping edge; a U-shaped bracket consisting of a yoke and two side walls, the yoke being directly in contact mechanically and thermally with the tubular depending portion, and the two side walls extending away from said engaged tubular portion and being spaced parallel to an axial plane through said tubular portion; and means supporting the wiper blade in the space between the two side walls of the bracket.

3. A heated window wiper, as in claim 2, in which the supporting means for the wiper blade includes a resilient biasing element to bias the wiper blade away from the depending portion of said arm and toward an associated window.

4. A heated window wiper, as in claim 2, in which the wiper blade is provided with a transverse supporting pin securely fitted to the rigid strip to serve functionally as a floating axle pivot for the wiper blade; and the side walls of the bracket are provided with aligned opposed slots to receive and guide the ends of the supporting pin of the wiper blade; and resilient spring means anchored on the side walls of the bracket and fitted over both ends of the supporting pin to exert a forward pressure force on said pin to bias the wiper blade, away from the depending arm portion and towards an associated window.

5. A heated wiper for a window that is to be exposed to freezing temperature conditions, said wiper comprising: a hollow tubular metallic operating arm having a hollow swivel tube portion, a hollow oscillator tube portion, and a hollow connector tube portion; a heating element disposed within said operating arm and extending the full length of the oscillator portion and of the connector tube portion; and means for supporting the heating element spaced from and electrically insulated from the metallic wall of the operating arm, said means consisting of powdered magnesium oxide tightly packed in the tubular arm around the heating element, and a plastic sealing compound closing off the hollow tube and sealing the powdered oxide therein.

References Cited in the file of this patent

UNITED STATES PATENTS

| | | |
|---|---|---|
| 1,719,006 | Fogland | July 2, 1929 |
| 2,537,411 | Klingler | Jan. 9, 1951 |
| 2,677,143 | Blaney | May 4, 1954 |

FOREIGN PATENTS

| | | |
|---|---|---|
| 342,556 | Great Britain | Feb. 5, 1931 |